US005577972A

United States Patent [19]
Herr

[11] Patent Number: 5,577,972
[45] Date of Patent: Nov. 26, 1996

[54] PULLEY SPACER FOR RACING ENGINES

[76] Inventor: Roger C. Herr, 106 Baynard Blvd., Wilmington, Del. 19803

[21] Appl. No.: 424,206

[22] Filed: Apr. 19, 1995

[51] Int. Cl.⁶ ..................................................... F16H 7/24
[52] U.S. Cl. ........................... 474/150; 474/903; 74/574
[58] Field of Search ................................. 474/148, 150, 474/166, 903; 74/572, 573 R, 574

[56] References Cited

U.S. PATENT DOCUMENTS

| 4,003,265 | 1/1977 | Craig et al. | 75/573 R X |
| 4,180,024 | 12/1979 | Hernandez | 474/903 X |
| 4,226,134 | 10/1980 | Suhnle | 474/903 X |
| 4,561,035 | 12/1985 | McDorman et al. | 74/573 R X |
| 4,889,011 | 12/1989 | Steahly | 74/573 R X |
| 5,163,883 | 11/1992 | Bradfield | 474/903 R X |
| 5,179,872 | 1/1993 | Pernice | 74/573 R X |

Primary Examiner—Roger J. Schoeppel
Attorney, Agent, or Firm—Eugene E. Renz, Jr.

[57] ABSTRACT

A pulley spacer for use with internal combustion racing engines that is a circular disc of a predetermined thickness for spacing the racing pulley from the engine to retain alignment of the racing pulley-water pump pulley drive belt. The disc includes an obverse face and a reverse face. The disc includes a centrally located aperture through the disc and the obverse face includes a groove of a predetermined width concentric with the aperture. The reverse face includes a circular flange of a predetermined width concentric with the aperture. The groove and circular flange mate, with very tight fit, with a corresponding flange and groove on the racing pulley and a standard balancer, respectively, to allow transmission of engine torque without shearing the bolts used to assemble the racing pulley-pulley spacer-standard balancer assembly.

12 Claims, 3 Drawing Sheets

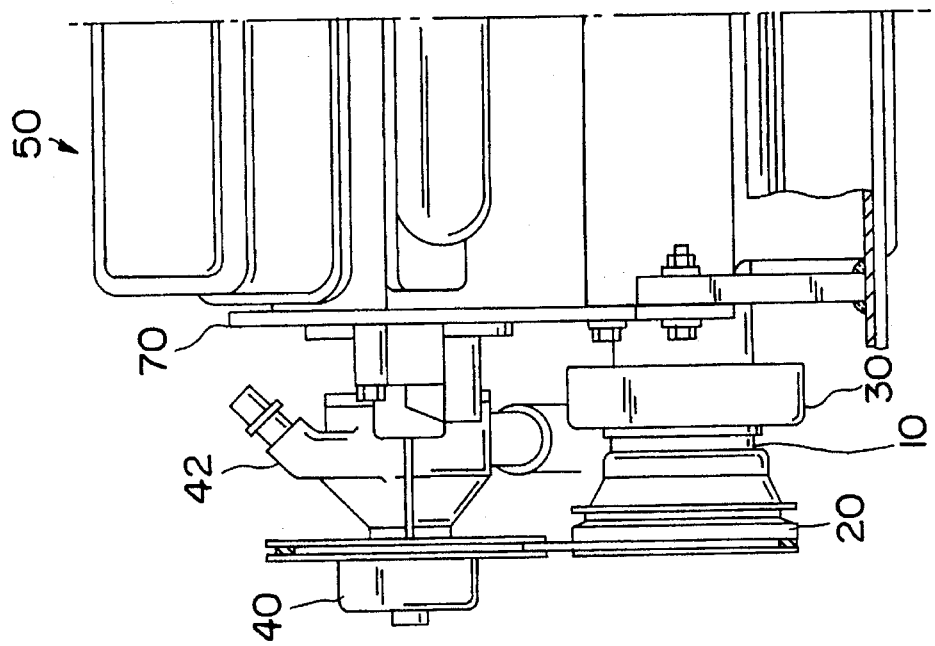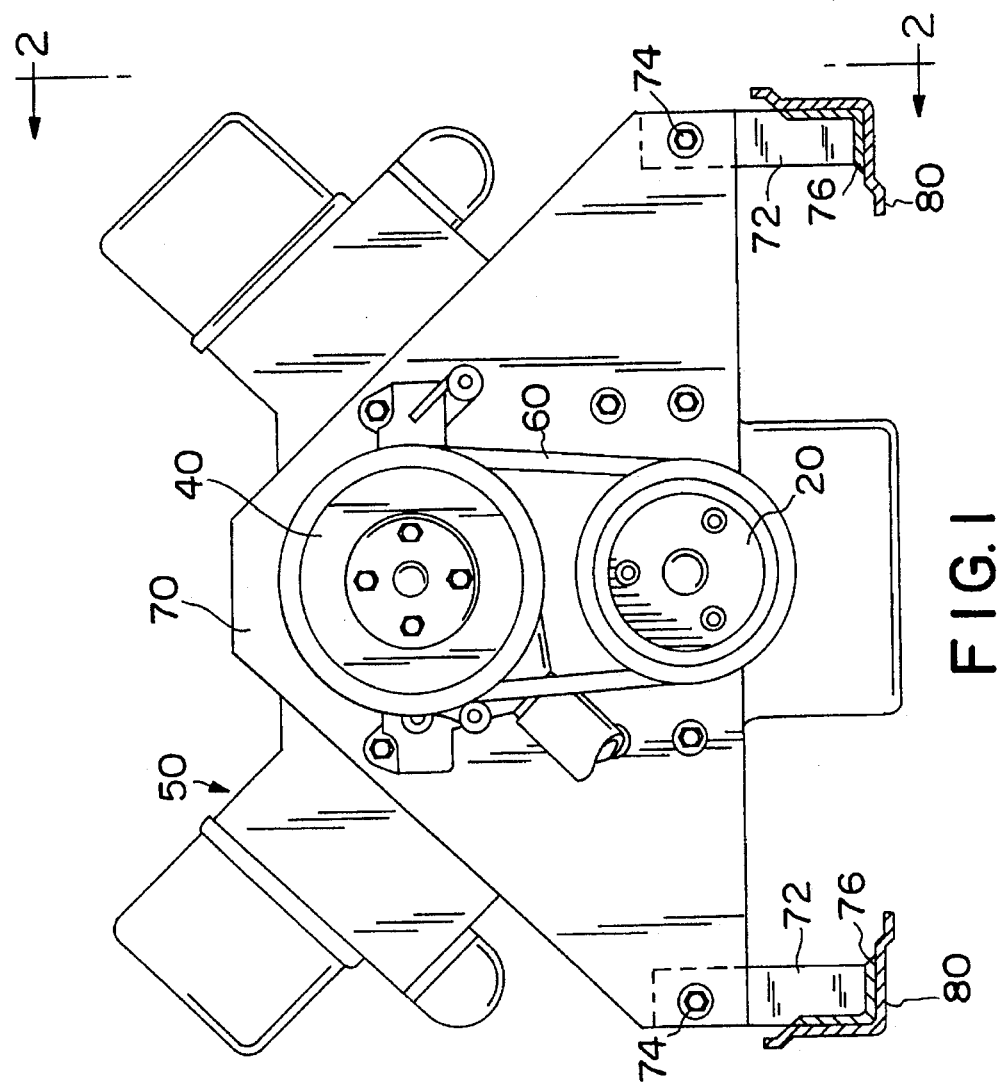

PULLEY SPACER FOR RACING ENGINES

FIELD OF THE INVENTION

This invention relates to pulley spacers for internal combustion racing engines, and particularly for use with racing pulleys and front motor plates installed on engines modified for racing.

BACKGROUND OF THE INVENTION

A growing hobbyist and professional endeavor is comprised of modifying, or "souping-up," stock automobile engines for National Hot Rod Association (NHRA) sanctioned competition racing. The modifications necessary to increase the horsepower of the engine to effectively compete increases the torque of the engine whereby further modifications are necessary to deal with the increased horsepower and torque of the engine.

Such modifications include a motor plate if mounted to the front of the engine block and is fixedly mounted to the car frame by bolting motor plate to tabs welded to the inner edges of the car frame. The motor plate assembly provides additional support to the modified engine. Otherwise the increased torque of the modified engine would separate the engine from its standard engine mounts. Also the standard engine drive pulley, which drives the water pump pulley, is replaced by a racing pulley which is strengthened to accommodate the increased engine power and torque. A common such racing pulley is the "MARCH" pulley which is used in such modified racing car engines.

In standard car engines, the drive pulley is operated by a balancer pressed onto the engine crankshaft. The balancer is placed between the drive pulley and the engine block and is weighted to provide a dampening device. A drive belt is operably attached to the drive pulley and the water pump pulley such that the respective belt grooves are vertically aligned. The drive pulley drives the water pump via the water pump pulley so that coolant water is circulated through the radiator to dissipate engine heat.

The drive pulley is attached to the balancer by three drive pulley bolts equally spaced circumferentially about the drive pulley. While the standard balancer may also be replaced by a modified, strengthened racing balancer which is of greater width, many times it is not so replaced. However, the "MARCH" racing pulley is constructed to accommodate racing balancers as described below.

The "MARCH" pulley includes a central bore which receives the balancer. Circumferentially extending flanges concentric with the central bore are one of which is adjacent the central bore provided which are in turn received by corresponding circumferentially extending grooves in the racing balancer. The "MARCH" pulley, standard balancer, and racing balancer each include three corresponding drive pulley bolts holes equally spaced circumferentially outward of the circumferentially extending flange which are aligned upon assembly to allow receipt of three respective drive pulley bolts to operably connect the "MARCH" pulley to either the standard balancer or the racing balancer.

The motor plate is of a roughly triangular configuration and is mounted to the front of the engine block with its apex at the top. It includes a mid-point cut-out area at its lower edge to accommodate the engine's balancer drive shaft and standard balancer. The engine's water pump is then bolted to the motor plate and thus is spaced a distance equal to the thickness of the motor plate from the engine block. The motor plate cut-out fits around the balancer drive shaft and standard balancer so that the "MARCH" pulley remains in its original position relative to the engine block such that the respective belt grooves of the "MARCH" pulley and water pump pulley are no longer in alignment.

To realign the belt grooves for efficient operation of the water pump, a group of smooth faced, circular spacers with central bores to accommodate the balancer are inserted between the "MARCH" pulley and the standard balancer. These spacers also include bolt holes to accommodate the drive pulley bolts.

Although the spacers allow for realignment of the "MARCH" pulley belt groove and the water pump pulley belt groove, the drive pulley bolts shear or break at relatively frequent intervals requiring their replacement which results in increased maintenance and cost as well as depriving the engine of coolant water since the "MARCH" pulley decreases or ceases rotation and thus no longer or inadequately drives the water pump pulley and water pump. During competitive races, such delays may cause a forfeit or engine damage at worst and major inconvenience at best while at least the drive pulley bolts are replaced.

It has been discovered that the increased torque of the modified engine is directed almost exclusively at the racing pulley bolts in the prior art method of using smooth faced spacers to space the "MARCH" pulley from the standard balancer which results in the high incidence of racing pulley bolt failures.

It is an object of the present invention to provide a pulley spacer which eliminates drive pulley bolt failure and subsequent loss of drive pulley.

SUMMARY OF THE INVENTION

It has now been discovered that the object(s) of the present invention can be accomplished in the following manner. Specifically, an improved pulley spacer has been discovered which is admirably suitable for spacing the racing drive pulley from the engine block to vertically align the belt grooves of the racing drive pulley and water pump pulley while eliminating drive pulley bolt failure.

The pulley spacer of the present invention is a circular disc of a thickness equal to that of the motor plate installed on the front of the engine block and includes a central stepped bore on its obverse face to receive the "MARCH" pulley flange adjacent its central bore. The pulley spacer also includes a second circumferentially extending groove concentric with the stepped bore on its obverse face which is of a predetermined width such that the "MARCH" pulley flange seats within the groove with a very tight fit. The reverse face of the pulley spacer of the present invention includes a circumferentially extending flange of a predetermined width such that it seats into a corresponding circumferentially extending groove in the standard balancer also with a very tight fit.

The pulley spacer also includes three drive pulley bolts equally spaced circumferentially outward of the circumferentially extending groove which align with the corresponding drive pulley bolt holes in the "MARCH" pulley and the standard balancer to allow receipt therein of the drive pulley bolts upon assembly of the "MARCH" pulley—pulley spacer—standard balancer assembly.

The tight fits of the "MARCH" pulley flange/pulley spacer groove and pulley spacer flange/standard balancer groove allow the increased torque of the modified racing engine to be transmitted evenly along these tight fitting flange/groove assemblies instead of almost exclusively through the racing pulley bolts used to assemble the "MARCH" pulley—spacer—standard balancer assembly. Thus, the pulley spacer of the present invention eliminates drive pulley bolt failure and subsequent loss of engine coolants.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a fragmentary front elevational view showing an internal combustion racing engine modified to include a motor plate securing the modified engine to the car frame via tabs welded to the car frame;

FIG. 2 is a fragmentary side elevational view taken on line 2, 2 of FIG. 1 showing additional details of a modified engine including a motor plate securing the engine block to the car frame, racing pulley, standard balancer and a pulley spacer of the present invention;

DETAILED DESCRIPTION OF THE PREFERRED EMBODIMENT

Figure 3:
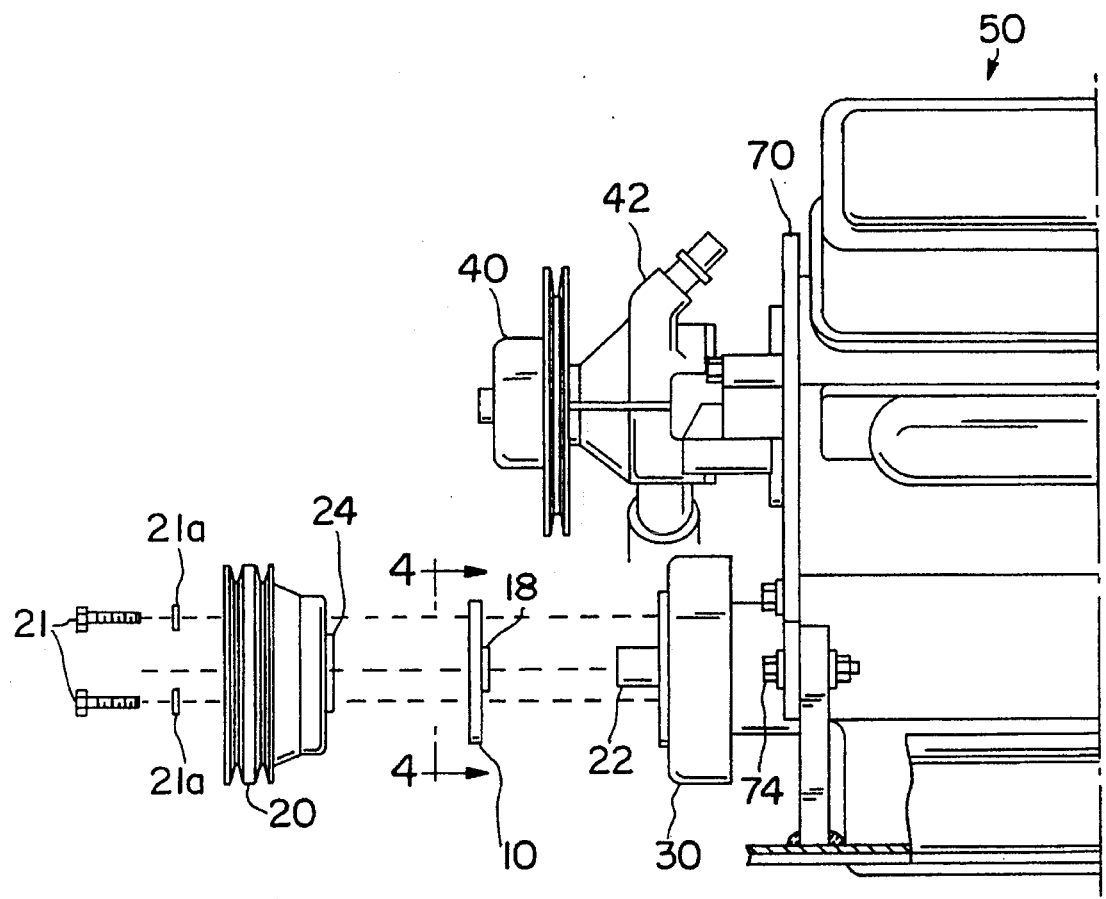
FIG. 3 is a partially exploded fragmentary side elevational view similar to FIG. 2 showing the racing pulley—pulley spacer—standard balancer assembly and racing pulley bolts prior to assembly.

Referring now to the drawings, and to FIGS. 2, 3, 4 and 5, the pulley spacer of the present invention is indicated generally by numeral 10 and is used in conjunction with internal combustion racing engine (50) to properly space racing pulley (20) from balancer (30) to align belt (60) in a generally vertical plane between racing pulley (20) and water pump pulley (40).

In an unmodified engine, water pump (42) is attached to the upper center of the front of engine (50) and is driven by water pump pulley (40). Directly below water pump (42) is standard balancer (30) and a standard drive pulley. As shown in FIG. 3, balance bolt protrudes through standard balancer (30) and seats within a central bore of the drive pulley. The drive pulley is directly below water pump pulley (40) such that belt (60) is generally vertically aligned to provide the efficient driving of water pump pulley (40) by the drive pulley. Standard balancer (30) is weighted to provide a fly wheel type efficient when driven by balance bolt (22).

Engine (50) shown in FIGS. 1, 2 and 3 has been modified to increase its horsepower, and therefore its torque for competition in races. Because of the greatly increased torque, generally triangularly shaped motor plate 70 is affixed to engine (50) by appropriate fastening means and to the car frame (80) by tabs (72). (See FIGS. 1, 2 and 3). Blocks (72) are bolted to each lower end of motor plate (70) by motor plate bolts (74) and are bolted to the tabs (72) which are welded to the car frame (80) at welds (76).

The mounted motor plate (70) provides additional support for the modified racing engine (50) and its increased torque. Without motor plate (70), racing engine (50) becomes dislodged from its standard engine mounts (not shown) during competitive racing. The standard drive pulley is replaced by a strengthened racing pulley (20). The most common racing pulley is the "MARCH™" pulley manufactured by MARCH PERFORMANCE, 32841 Park, Garden City, Mich. 48135. It is also possible to replace standard balancer (30) with a strengthened racing balancer (not shown). However, many times this is not necessary and to conserve costs, the standard balancer (30) is used with MARCH pulley (20).

Motor plate (70) includes a cut-out at its central lower edge to accommodate standard balancer (30). Upon assembly of motor plate (70) to racing engine (50), water pump (42) is removed from the engine (50) and is bolted to motor plate (70). Thus water pump (42) and water pump pulley (40) are spaced outwardly from engine (50), a distance equal to the thickness of motor plate (70) which causes misalignment of belt (60) between water pump pulley (40) and "MARCH" pulley (20).

"MARCH" pulley (20) was designed to be used with a racing balancer. MARCH pulley (20) includes a central bore within which balancer belt (22) seats, and a first circumferentially extending flange (26) proximate to central bore (28) which fits within a corresponding circumferentially extending groove in the racing balancer. "MARCH" pulley (20) further includes a second circumferentially extending flange (24) concentric with its central bore (28) which fits within a corresponding second circumferentially extending groove in the racing balancer. Drive pulley bolts (21a) bolt "MARCH" pulley (20) to the racing balancer through three equally circumferentially spaced bolt holes (23) in the "MARCH" pulley and the racing balancer.

When "MARCH" pulley (20) is used with standard balancer (30), "MARCH" pulley (20) must be spaced from standard balancer (30) a distance equal to the width of motor plate (70) as seen in FIG. 2 to maintain the vertical alignment of belt (60). Pulley spacer (10) of the present invention may be used to properly space "MARCH" pulley (20) from standard balancer (30) and is of novel construction so as to transmit the torque of the drive pulley shaft to the "MARCH" pulley without shearing or breaking drive pulley bolts (21).

Pulley spacer (10) includes three equally circumferentially spaced bolt holes 16 corresponding to the "MARCH" pulley bolt hole (23) and standard balancer bolt holes (32). Upon assembly of the "MARCH" pulley (20)—pulley spacer (10)—standard balancer (30) the bolt holes 16, 23 and 32 are aligned so drive pulley bolts, with drive pulley washers (21a), are inserted therethrough to assemble these parts.

Figure 4:
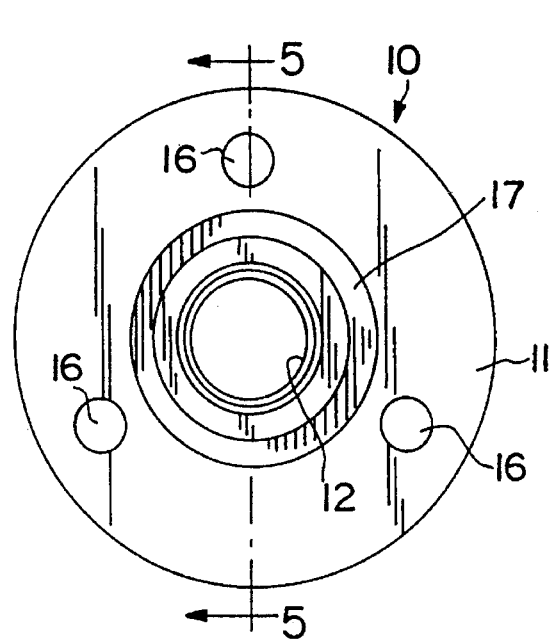
FIG. 4 is an enlarged front elevational view of the obverse face of the pulley spacer of the present invention taken on line 4, 4 of FIG. 3.
Figure 5:
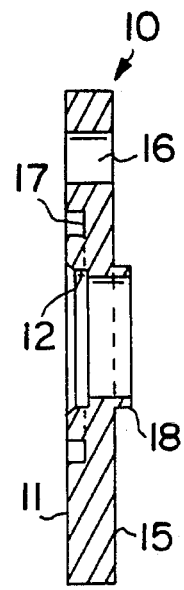
FIG. 5 is a sectional view of the pulley spacer of the present invention taken on line 5, 5 of FIG. 4.

As best illustrated in FIGS. 4 and 5, pulley spacer (10) is a circular disc with a central stepped bore (12) through which balancer bolt (22) passes. The shoulder of stepped bore (12) faces the obverse face (11) of pulley spacer (10) which includes a circumferentially extending groove (17) concentric with stepped bore (12). Grove (17) is of a width such that "MARCH" pulley flange (24) seats within groove (17) with a very tight fit, shown in FIG. 6, such that rotation of pulley spacer (10) causes rotation of "MARCH" pulley (20) almost exclusively through the "MARCH" pulley flange (24)—pulley spacer—groove (17) interface.

Figure 6:
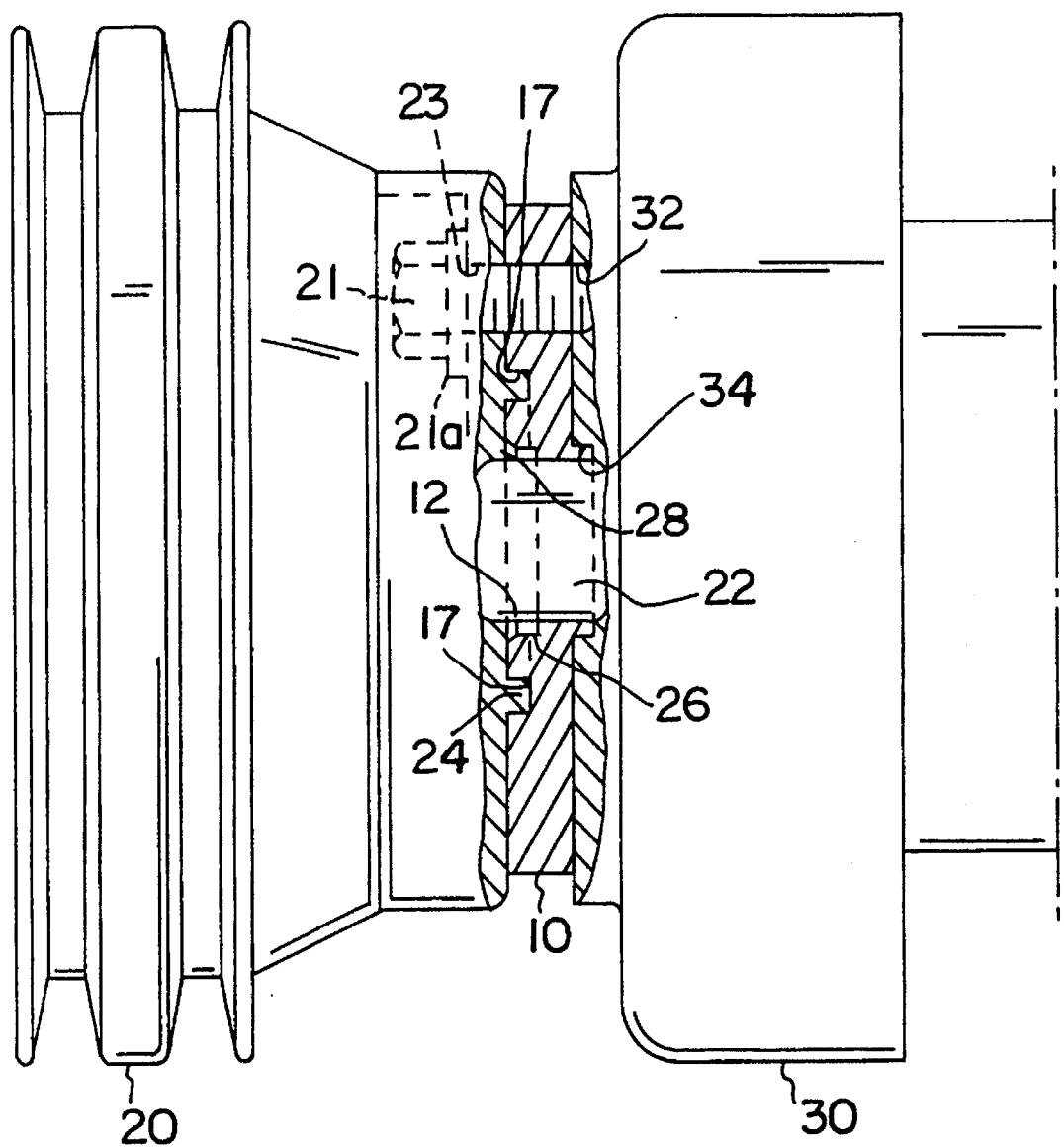
FIG. 6, is an enlarged, side elevational view of the bottom portion of the motor shown in FIG. 2, in partial section, illustrating the invention as assembled in the motor.

The reverse face of pulley spacer (10) includes flange (18) concentric and proximate to pulley spacer central bore 12 as best shown in FIG. 5. Standard balancer (30) includes stepped bore 34 wherein the pulley space flange (18) seats. Pulley space flange (18) is of a predetermined width such flange (18) seats within balance stepped bore (34) with a very tight fit again as shown in FIG. 6, such that rotation of standard balancer (30) causes rotation of pulley spacer (10) almost exclusively through the pulley spacer flange (18)—balancer stepped bore (34) interface.

Thus, the "MARCH" pulley (20) is driven by the racing engine (50) with its increased torque through the pulley spacer flange (18)—balancer stepped bore (34) interface, and "MARCH" pulley flange (24)—pulley spacer groove (17) interface, and drive pulley bolts (21) are relieved from the torque stress previously encountered when smooth faced spacers were used to space "MARCH" pulley (20) from standard balancer (30) which resulted in failure of drive pulley bolts (21). See FIG. 6.

While particular embodiments of the present invention have been illustrated and described herein, it is not intended to limit the invention and changes and modifications may be made thereon within the scope of the following claims:

What is claimed is:

1. For use in combination with internal combustion racing engines having a pulley spacer and a balancer, a pulley spacer comprising:

a disc of a predetermined thickness having an obverse face and a reverse face, said disc including a centrally located aperture through said disc;

said obverse face including a groove of a predetermined width concentric with said aperture to receive a pulley flange with an interference fit; and said reverse face including a circular flange of a predetermined width concentric with said aperture to engage in a balancer groove to provide an interference fit.

2. The combination of claim 1, wherein said disc is circular.

3. The combination of claim 1, a plurality of axially aligned bolt holes spaced to align with bolts used to mount a high strength pulley for driving a water pump pulley on said engine.

4. The combination of claim 3, wherein said high strength pulley includes an annular ring for engagement with said groove to thereby cause said high strength pulley to rotate upon rotation of said spacer.

5. The combination of claim 1, a plurality of axially aligned bolt holes spaced to align with bolts used to mount a balancer for aligning a water pump pulley on said engine.

6. The combination of claim 5, wherein said balancer includes an annular stepped bore for engagement with said circular flange to thereby cause said pulley spacer to rotate upon rotation of said balancer.

7. An internal combustion engine having a high strength pulley adapted to withstand high torque, and a balancer for aligning a water pump pulley with said high strength pulley, the improvement comprising in combination:

a pulley spacer positioned between said high strength pulley and said balancer, said pulley spacer having a predetermined thickness and a centrically located aperture to align said water pump pulley with said high strength pulley;

said pulley having an obverse face and a reverse face;

said obverse face including a groove of a predetermined width concentric with said aperture to receive said pulley flange with an interference fit; and said reverse face including a circular flange of a predetermined width concentric with said aperture engageable in said balancer groove to prove an interference fit.

8. The combination of claim 7, wherein said disc is circular.

9. The combination of claim 7, which includes a plurality of axially aligned bolt holes spaced to align with bolts used to mount a high strength pulley for driving a water pump pulley on said engine.

10. The combination of claim 9, wherein said high strength pulley includes an annular ring for engagement with said groove to thereby cause said high strength pulley to rotate upon rotation of said spacer.

11. The combination of claim 7, which includes a plurality of axially aligned bolt holes spaced to align with bolts used to mount a balancer for aligning a water pump pulley on said engine.

12. The combination of claim 11, wherein said balancer includes an annular stepped bore for engagement with said circular flange to thereby cause said pulley spacer to rotate upon rotation of said balancer.

* * * * *